United States Patent
Nishio et al.

(10) Patent No.: US 8,755,125 B2
(45) Date of Patent: Jun. 17, 2014

(54) ZOOM LENS UNIT AND IMAGING APPARATUS INCORPORATING THE SAME

(71) Applicant: Olympus Imaging Corp., Tokyo (JP)

(72) Inventors: Akinori Nishio, Tokyo (JP); Daichi Murakami, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 5 days.

(21) Appl. No.: 13/737,440

(22) Filed: Jan. 9, 2013

(65) Prior Publication Data

US 2013/0242409 A1 Sep. 19, 2013

(30) Foreign Application Priority Data

Mar. 14, 2012 (JP) .................................. 2012-056676

(51) Int. Cl.
*G02B 15/14* (2006.01)

(52) U.S. Cl.
USPC .......................................................... 359/694

(58) Field of Classification Search
USPC ................................................... 359/694–696
See application file for complete search history.

(56) References Cited

U.S. PATENT DOCUMENTS 7,990,626 B2 * 8/2011 Fukino ........................ 359/700

FOREIGN PATENT DOCUMENTS

| JP | 2011-211381 | 10/2011 |
| JP | 2011-211717 | 10/2011 |

* cited by examiner

*Primary Examiner* — Tuyen Tra
(74) *Attorney, Agent, or Firm* — Kenyon & Kenyon LLP

(57) ABSTRACT

A zoom lens unit 1 includes a zoom lens L operable to move a plurality of lens groups in an optical axis direction upon zooming from a wide-angle end to a telephoto end, a first lens group frame 7 for supporting the first lens group $G_1$ positioned on the most object side of the zoom lens L, and a drive 3 operable to move the first lens group frame 7 in a direction vertical to the optical axis.

5 Claims, 17 Drawing Sheets

Example 1

FIG.7
Example 1
(Initial State)
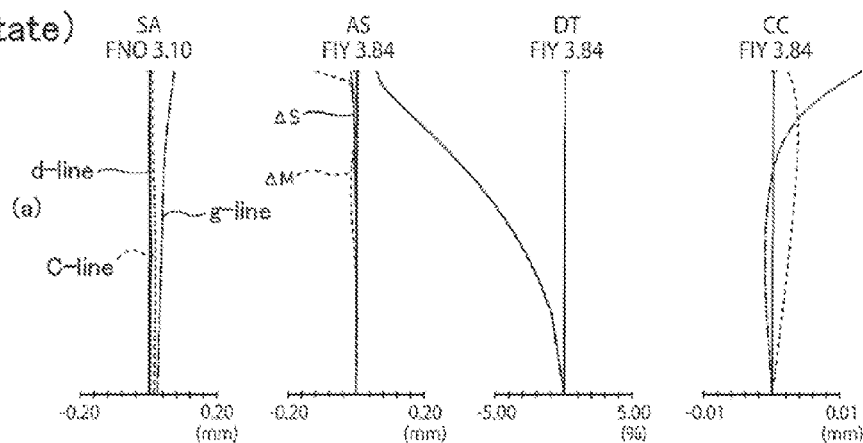
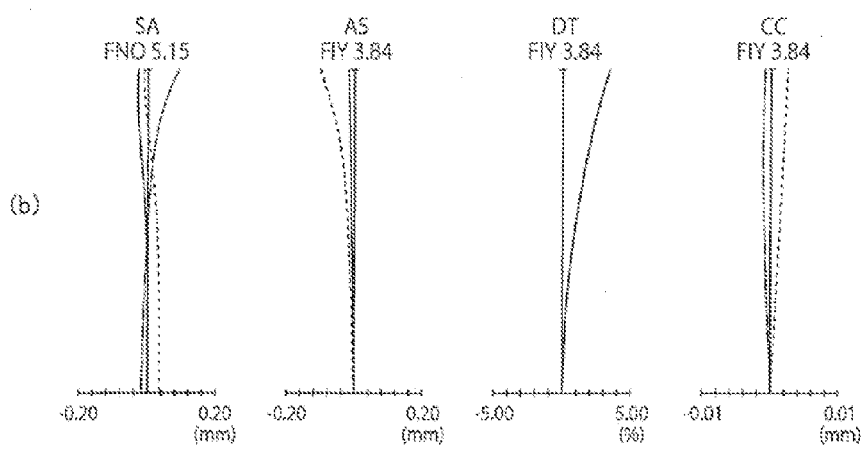
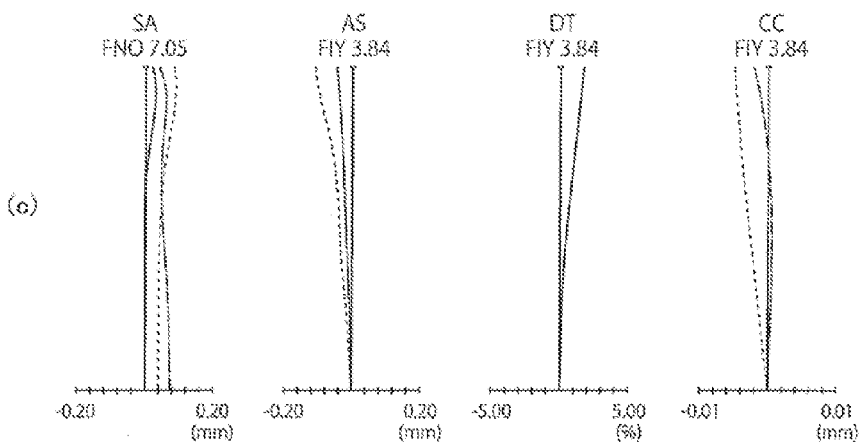

FIG.8
Example 2
(Initial State)
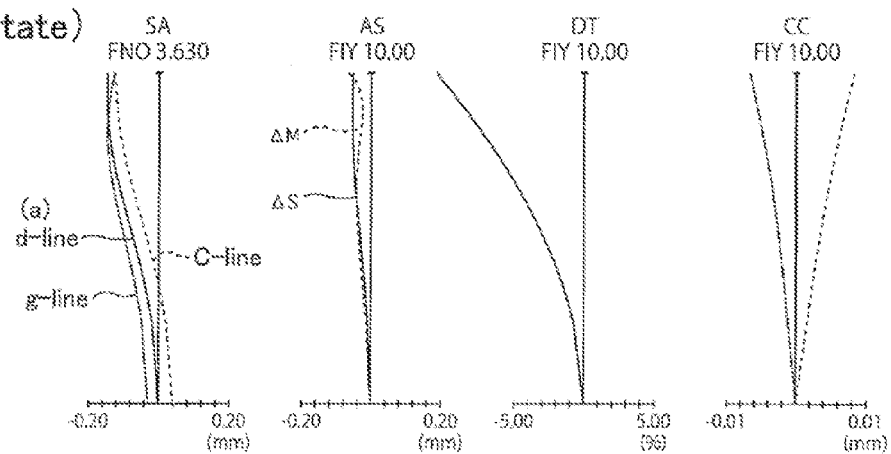
(a)
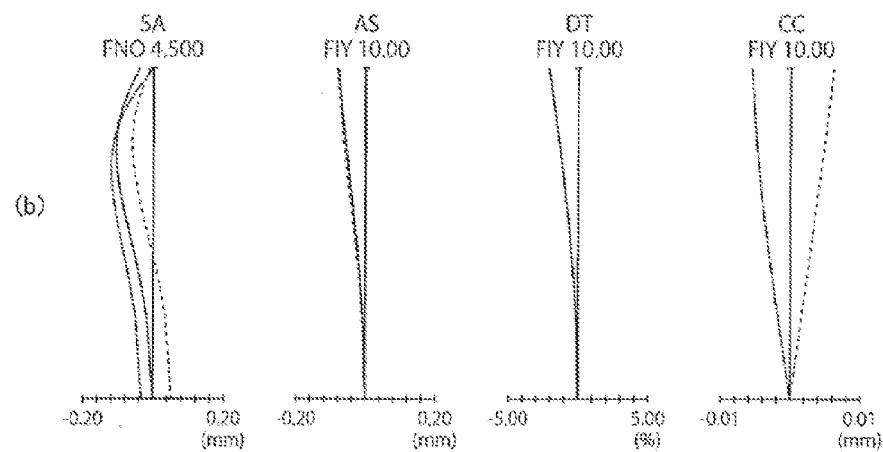
(b)
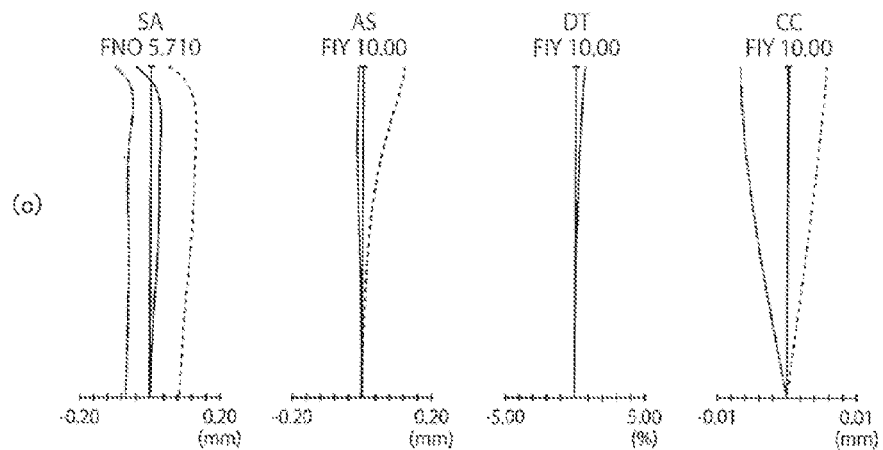
(c)

Example 1 (Decentered State)

FIG.10
Example 2
(Decentered State)
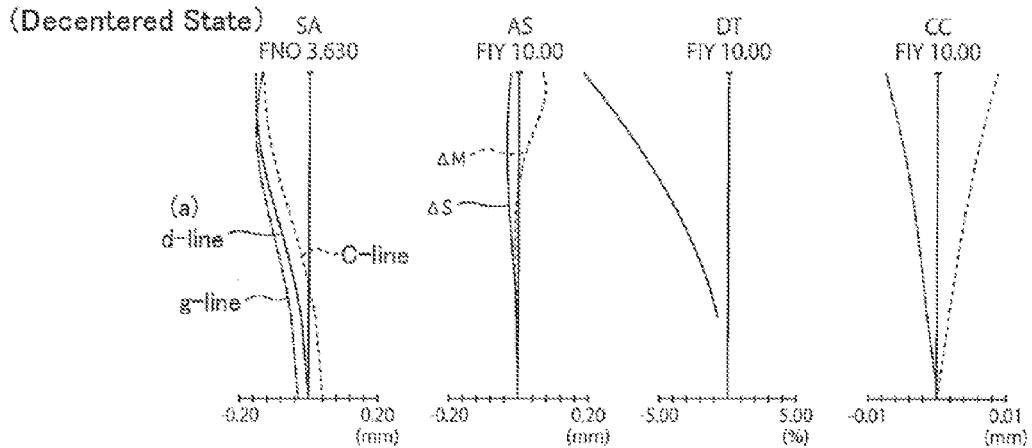
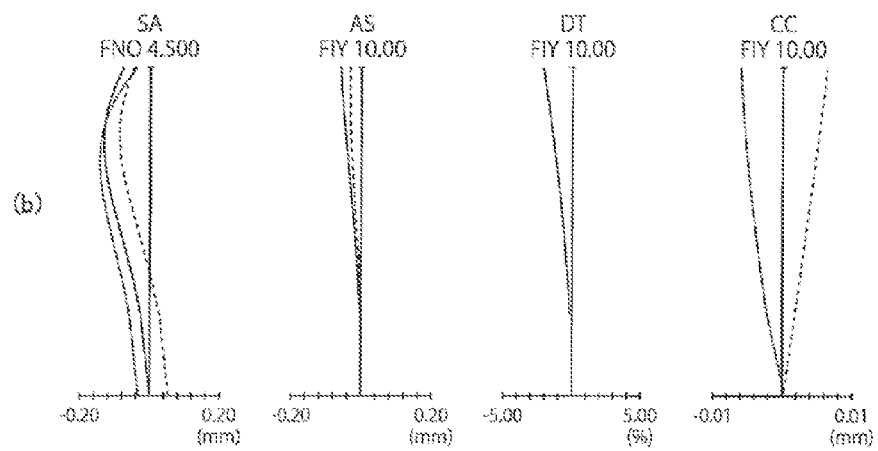
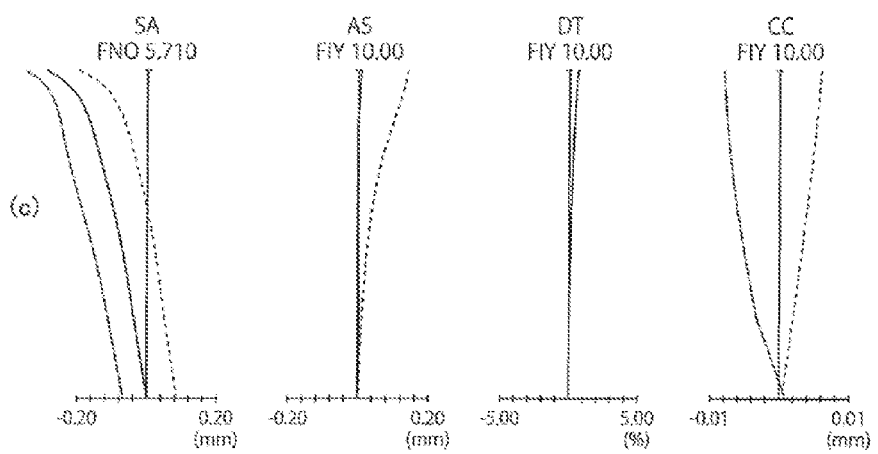

ZOOM LENS UNIT AND IMAGING APPARATUS INCORPORATING THE SAME

CROSS-REFERENCE TO RELATED APPLICATIONS

This application claims benefit of Japanese Application No. 2012-056676 filed in Japan on Mar. 14, 2012, the contents of which are incorporated by this reference.

BACKGROUND OF THE INVENTION

The present invention relates generally to a zoom lens unit, and more particularly to a zoom lens unit capable of 3D imaging with a one-eye construction or arrangement. The invention also relates to an imaging apparatus comprising that zoom lens unit.

In typical 3D imaging, and 3D image displays so far known in the art, images are detected by two or more imaging optical systems located with parallax as in the human being s eyes, and the quantity of parallax occurring in a subject is used to show the subject distance and depth on a display apparatus thereby displaying 3D images.

In a typical arrangement comprising two or more imaging optical systems disposed for detecting the quantity of parallax, two or more imaging apparatus are located in different positions or two different optical systems are located in one single imaging apparatus (see JP(A) 2011-211717 and 2011-211381).

SUMMARY OF THE INVENTION

According to one embodiment of the invention, there is a zoom lens unit provided, comprising a zoom lens including a plurality of lens groups operable to move in an optical axis direction upon zooming from a wide angle end to a telephoto end, a first lens group frame for supporting a first lens group positioned on the most object side of said zoom lens, and a drive operable to move said first lens group frame in a vertical direction to said optical axis.

According to one embodiment of the invention, the zoom lens unit should satisfy the following condition (1):

$$0.0005 < |\alpha/D| < 0.2 \quad (1)$$

where $\alpha$ is the maximum distance between a point of connection of said optical axis with an image plane in an initial state of said first lens group before its movement and a point of connection of said optical axis with said image plane in a decentered state of said first lens group after its movement, and D is the maximum image height at said image plane.

According to one embodiment of the invention, the zoom lens unit should also satisfy the following condition (2):

$$0 < |AS| \le 0.05 \quad (2)$$

where AS is the quantity of change of field curvature of a meridional surface at a diagonal position.

Suppose here that the position of the first lens group in an initial state before its movement is the first position, and the position of the first lens group in a decentered state after its movement, where the first lens group is away from said initial state by a given distance in a direction vertical to said optical axis, is the second position. The first lens group frame moves to a third position symmetric with respect to the second position with said optical axis as center.

According to one embodiment of the invention, there is an imaging apparatus provided, comprising said zoom lens unit, an imaging device that is located on an image side of said zoom lens unit and includes an imaging plane for receiving an image formed through said zoom lens unit, and an imaging apparatus body including said imaging device disposed inside.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is a set of aberration diagrams for the zoom lens according to Example 1 in its initial state.

FIG. 8 is a set of aberration diagrams for the zoom lens according to Example 1 in its decentered state.

FIG. 10 is a set of aberration diagrams for the zoom lens according to Example 2 in its decentered state.

DESCRIPTION OF EXEMPLARY EMBODIMENTS

The zoom lens unit according to one embodiment of the invention will now be explained with reference to the accompanying drawings.

Figure 1:
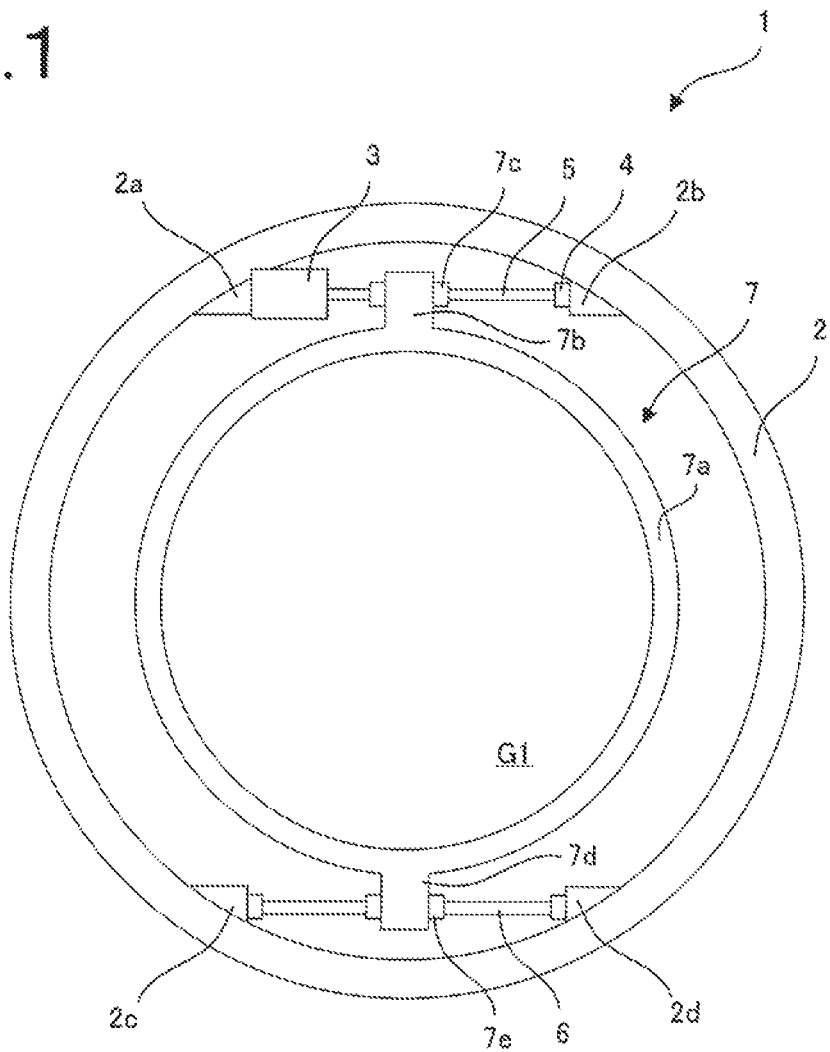
FIG. 1 is a front view of the zoom lens unit according to Example 1.
Figure 2:
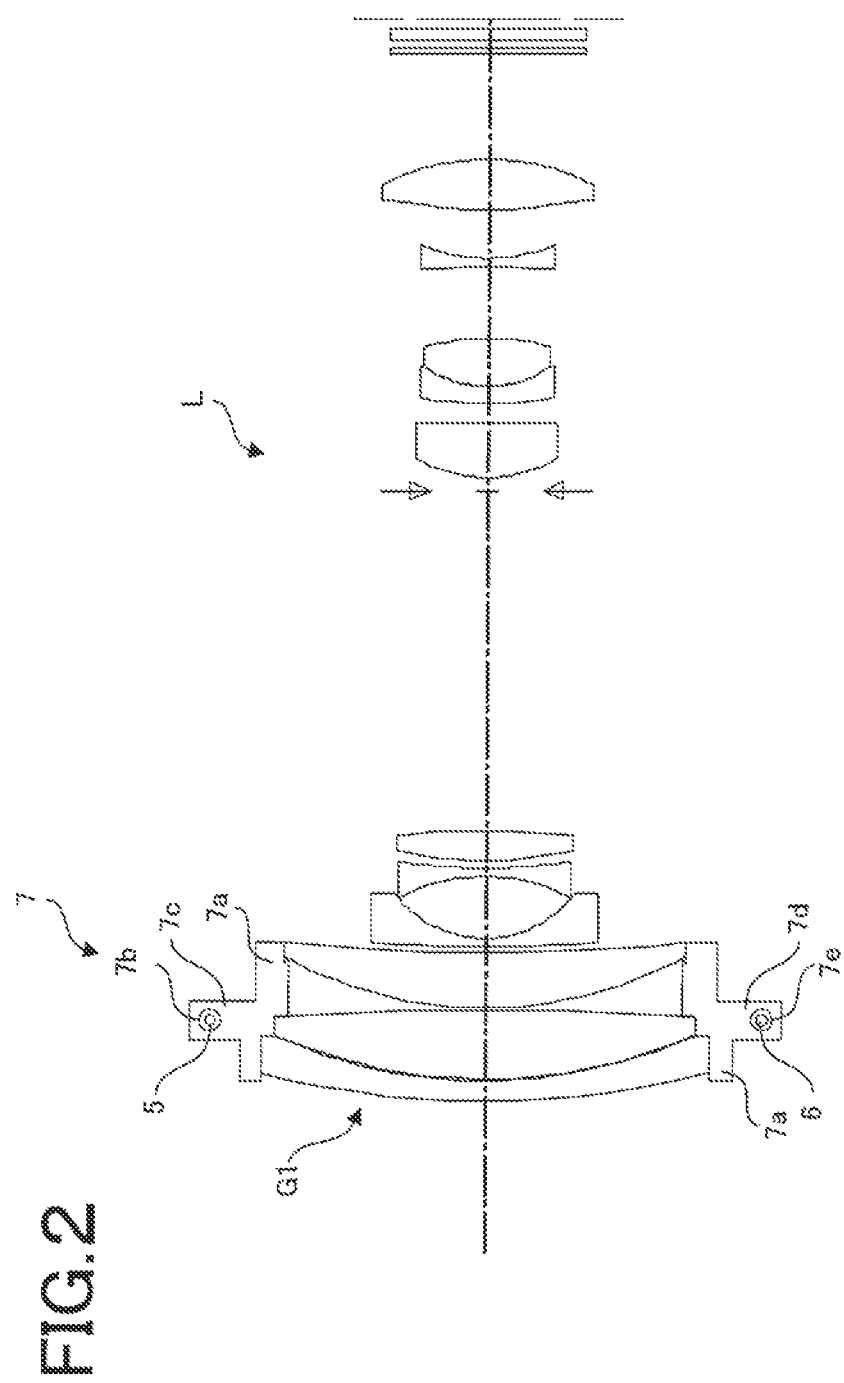
FIG. 2 is a sectional view of the zoom lens unit according to Example 1.
Figure 3:
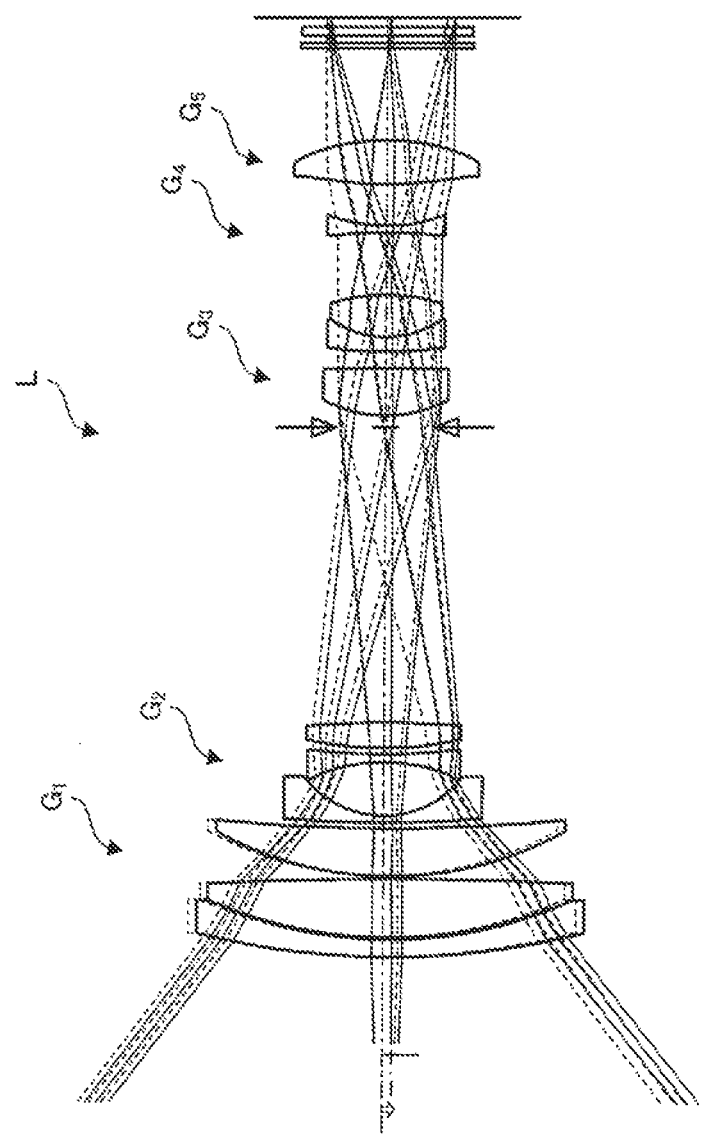
FIG. 3 is illustrative of the zoom lens according to Example 1 after its movement in the direction vertical to the optical axis.
Figure 4:
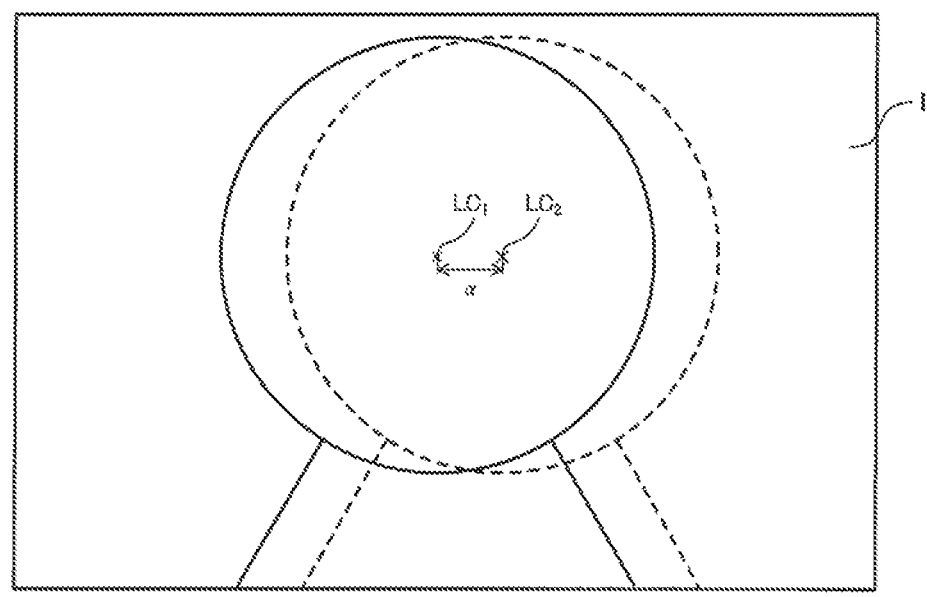
FIG. 4 is a front view of the zoom lens according to Example 1 after its movement in the direction vertical to the optical axis.

FIG. 1 is a front view of the zoom lens unit according to Example 1. FIG. 2 is a sectional view of the zoom lens unit according to Example 1. FIG. 3 is illustrative of the zoom lens according to Example 1 after its movement in the direction vertical to the optical axis. FIG. 4 is a front view of the zoom lens according to Example 1 after its movement in the direction vertical to the optical axis.

A zoom lens unit indicated generally at 1 includes an annular frame member 2, a motor 3 operable as the drive and attached to a first support 2a extending in the frame member 2, a bearing 4 attached to a second support 2b extending in the frame member 2, a first shaft 5 that is rotatably driven at one end by the motor 3 and rotatably supported at the other end by the bearing 4, and is partly threaded, a second shaft 6 attached to a third support 2c and a fourth support 2d extending in the frame member 2, and a first lens group frame 7 for fixing thereto a first lens group $G_1$ in a zoom lens L.

The first lens group frame 7 includes an annular support 7a for supporting the first lens group $G_1$, a first shaft support 7b extending out of the annular support 7a, a threaded portion 7c that is integrally fixed to the first shaft support 7b and has a thread 7c capable of mating with the thread formed on the first shaft 5, a second shaft support 7d extending out of the annular support 7a, and a second shaft support 7e that is integrally fixed to the second shaft support 7d and movable with the second shaft 6.

As the zoom lens unit according to the instant embodiment receives an instruction on 3D imaging from an input (not shown) or the like, it causes an image to be taken in the first position indicated by a solid line in FIG. 3. Then, the motor 3 is driven to move the first lens group $G_1$ in the direction vertical to the optical axis, thereby taking an image in the second position indicated by a broken line in FIG. 3, which position is parallel with the first position and differs in parallax.

In the initial state, therefore, the light is imaged at the center $LC_1$ of the imaging device as indicated by a solid line in FIG. 4 through an optical path shown by a solid line in FIG. 3. In the decentered state, however, the light is imaged at a position $LC_2$ off the center of the imaging device as indicated by a broken line in FIG. 4 through an optical path indicated by a solid line in FIG. 3, so imaging information having different parallaxes may be obtained from the imaging device. The image detected in the initial state provides an image indicated by a solid line in FIG. 4, and the image detected in the decentered state provides an image indicated by a broken line in FIG. 4. To put it another way, there is an image with parallax obtained.

The movement of the first lens group G1 is explained. First, as the motor 3 is driven, it causes rotation of the first shaft 5. As the first shaft 5 rotates, it causes axial direction movement of the threaded portion 7c having a thread capable of mating with the thread formed on the first shaft 5. Upon axial direction movement of the threaded portion 7c, there is movement of the whole first lens group frame 7 integrally fixed to the threaded portion 7c. In association with this, the second shaft support 7e moves in the axial direction with respect to the second shaft 6.

Thus, the zoom lens unit 1 according to the instant embodiment includes the zoom lens L comprising a plurality of lens groups movable in the optical axis direction upon zooming from a wide-angle end to a telephoto end, the first lens group frame 7 for supporting the first lens group $G_1$ positioned on the most object side of the zoom lens L, and the motor 3 operable to move the first lens group frame 7 in the direction vertical to the optical axis: it is possible to implement 3D imaging with a simple arrangement and by means of a single optical system. Movement of the first lens group $G_1$ ensures that the quantity of aberration fluctuations is more reduced than could be achieved with other lens groups.

According to one embodiment of the invention, the zoom lens unit satisfies the following condition (1):

$$0.0005 < |\alpha/D| < 0.2 \quad (1)$$

where $\alpha$ is the maximum distance between a point of connection of said optical axis with an image plane in an initial state of said first lens group before movement and a point of connection of said optical axis with said image plane in a decentered state of said first lens group after movement, and D is the maximum image height at said image plane. This makes sure the aberrations can be much more reduced.

According to one embodiment of the invention, the zoom lens unit also satisfies the following condition (2):

$$0 < |AS| \leq 0.05 \quad (2)$$

where AS is the quantity of change of field curvature of a meridional surface at a diagonal position. This makes sure the aberrations can be much more reduced.

It is here to be noted that the first lens group $G_1$ may move in any direction within a plane vertical to the optical axis, and that parallaxes may be detected in two or more states depending on the direction and distance of movement of the first lens group $G_1$. By detecting parallaxes in two or more states, it is possible to generate 3D images at various angles, and this is preferable because of leading to an increase in the degree of freedom in the generation of 3D images.

Suppose again that the position of the first lens group in an initial state before its movement is the first position, and the position of the first lens group $G_1$ in a decentered state after its movement, where the first lens group is away from said initial state by a given distance in a direction vertical to said optical axis, is the second position. The first lens group frame 7 in the zoom lens unit may be set in such a way as to move to the third position symmetric with respect to the second position with said optical axis as center.

More specifically, the optical axis is set such that light is imaged at the center of the imaging device in the first position in the initial state, and in the decentered state, the first lens group frame moves to the second position away from the initial state by a given distance in the vertical direction to the optical axis, and then to the third position symmetric with respect to the second position with the optical axis as center. Consequently, the distance from the optical axis in the initial state to the optical axis in the decentered state is reduced down by half, making it possible to reduce aberrations of 3D images.

Movement of the first lens group $G_1$ may be implemented just only by linear movement but also by rotational movement. For instance, an axis parallel with the optical axis in the initial state may be set in a position away from the optical axis by a given distance. Then, the first lens group $G_1$ is rotated with respect to the parallel axis for movement.

Figure 5:
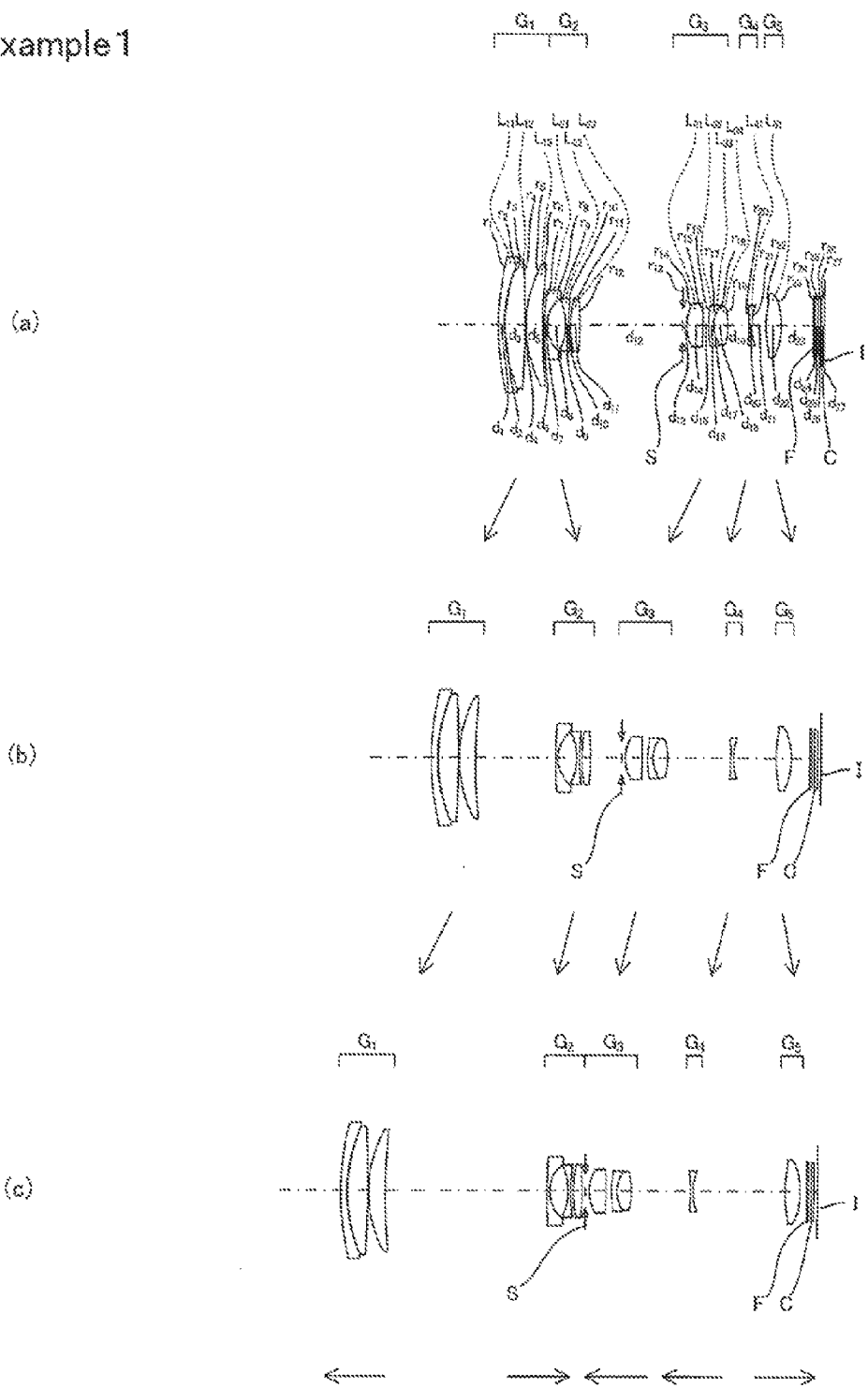
FIG. 5 is a sectional view of the zoom lens according to Example 1 as taken apart along the optical axis.
Figure 6:
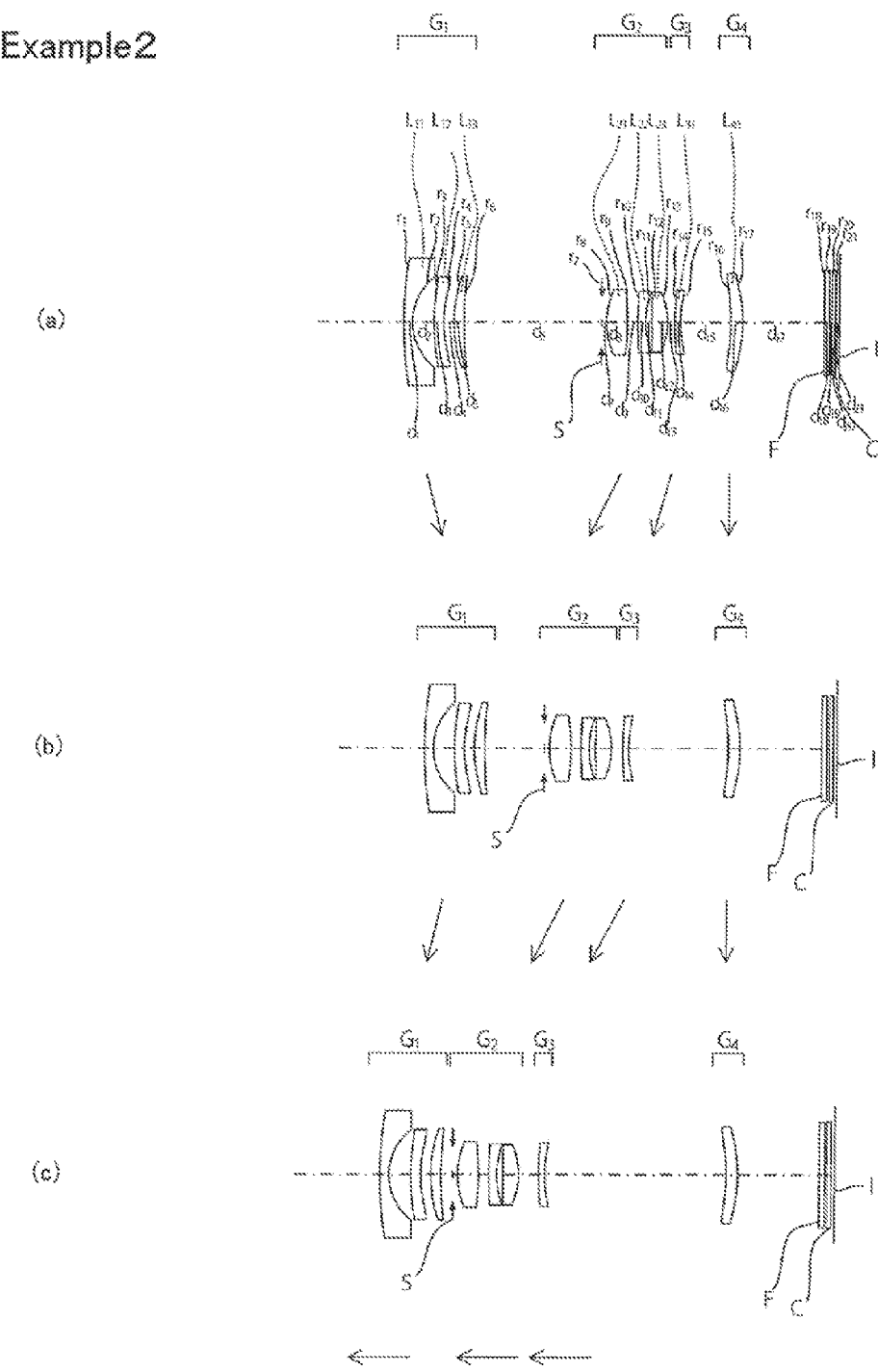
FIG. 6 is a sectional view of the zoom lens according to Example 2 as taken apart along the optical axis.

FIG. 5 is a sectional view of the zoom lens of Example 1 as taken apart along the optical axis, wherein (a), (b), and (c) are indicative of the wide-angle end (WE), the standard setting (ST), and the telephoto end (TE), respectively.

A flat plate just in front of the image plane is a cover glass C for the imaging device, and a flat plate on the object side of the cover glass C is a filter F.

FIG. 1 is a sectional view of the zoom lens according to Example 1.

As shown in FIG. 1, the zoom lens of Example 1 is built up of, in order from the object side to the image side, a first lens group $G_1$ of positive refracting power, a second lens group $G_2$ of negative refracting power, a third lens group $G_3$ of positive refracting power, a fourth lens group $G_4$ of negative refracting power, and a fifth lens group $G_5$ of positive refracting power. In FIG. 1, S, F, C, and I are indicative of an aperture stop, a filter, a cover glass, and an image plane, respectively.

The first lens group $G_1$ is made up of, in order from the object side to the image side, a negative meniscus lens $L_{11}$ convex on its object side, a double-convex positive lens $L_{12}$, and a positive meniscus lens $L_{13}$ convex on its object side.

The second lens group $G_2$ is made up of, in order from the object side to the image side, a negative meniscus lens $L_{21}$ convex on its object side, a double-concave negative lens $L_{22}$, and a double-convex positive lens $L_{23}$.

The third lens group $G_3$ is made up of, in order from the object side to the image side, a double-convex positive lens $L_{31}$, a negative meniscus lens $L_{32}$ convex on its object side, and a convex positive lens $L_{33}$.

Between the second lens group $G_2$ and the third lens group $G_3$, there is the aperture stop S interposed.

The fourth lens group $G_4$ consists of one double-concave negative lens $L_{41}$.

The fifth lens group $G_5$ consists of one double-convex positive lens $L_{51}$.

How the respective lens groups move upon zooming from the wide-angle end to the telephoto end of the zoom lens according to Example 1 is now explained.

Upon zooming operation, the first lens group $G_1$, the second lens group $G_2$, the third lens group $G_3$, the fourth lens group $G_4$, and the fifth lens group $G_5$ move independently.

From the wide-angle end to the telephoto end, the first lens group $G_1$ moves to the object side alone while the spacing between it and the second lens group $G_2$ grows wide. The first lens group $G_1$ is positioned more on the object side at the telephoto end than at the wide-angle end.

From the wide-angle end to the standard setting, the second lens group $G_2$ moves to the image side while the spacing between the first lens group $G_1$ and it grows wide and the spacing between it and the third lens group $G_3$ becomes narrow, and from the standard setting to the telephoto end, the second lens group $G_2$ moves to the object side while the spacing between the first lens group $G_1$ and it grows wide and the spacing between it and the third lens group $G_3$ becomes narrow. The second lens group $G_2$ is positioned more on the image side at the telephoto end than at the wide-angle end.

From the wide-angle end to the standard setting, the third lens group $G_3$ moves with the aperture stop S to the object side while the spacing between the second lens group $G_2$ and it becomes narrow and the spacing between it and the fourth lens group $G_4$ grows wide, and from the standard setting to the telephoto end, the third lens group $G_3$ moves to the object side while the spacing between the second lens group $G_2$ and it becomes narrow and the spacing between it and the fourth lens group $G_4$ becomes narrow. The third lens group $G_3$ is positioned more on the object side at the telephoto end than at the wide-angle end.

From the wide-angle end to the standard setting, the fourth lens group $G_4$ moves to the object side while the spacing between the third lens group $G_3$ and it grows wide and the spacing between it and the fifth lens group $G_5$ grows wide, and from the standard setting to the telephoto end, the fourth lens group $G_4$ moves to the object side while the spacing between the third lens group $G_3$ and it becomes narrow and the spacing between it and the fifth lens group $G_5$ grows wide. The fourth lens group $G_4$ is positioned more on the object side at the telephoto end than at the wide-angle end.

From the wide-angle end to the telephoto end, the fifth lens group $G_5$ moves to the image side alone while the spacing between the fourth lens group $G_4$ and it grows wide. The fifth lens group $G_5$ is positioned more on the image side at the telephoto end than at the wide-angle end.

Six aspheric surfaces are used: two at both surfaces $r_9$ and $r_{10}$ of the double-concave negative lens $L_{24}$ in the second lens group $G_2$, two at both surfaces $r_{14}$ and $r_{15}$ of the double-convex positive lens $L_{31}$ in the third lens group $G_3$, and two at both surfaces $r_{22}$ and $r_{23}$ of the double-convex positive lens $L_{51}$ forming the fifth lens group $G_5$.

FIG. 2 is a sectional view of the zoom lens according to Example 2.

As shown in FIG. 2, the zoom lens of Example 2 is built up of, in order from the object side to the image side, a first lens group $G_1$ of negative refracting power, a second lens group $G_2$ of positive refracting power, a third lens group $G_3$ of negative refracting power, and a fourth lens group $G_4$ of positive refracting power. In FIG. 2, S, F, C, and I are indicative of an aperture stop, a filter, a cover glass, and an image plane, respectively.

The first lens group $G_1$ is made up of, in order from the object side to the image side, a negative meniscus lens $L_{11}$ convex on its object side, a negative meniscus lens $L_{12}$ convex on its object side, and a positive meniscus lens $L_{13}$ convex on its object side.

The second lens group $G_2$ is made up of, in order from the object side to the image side, a double-convex positive lens $L_{21}$, a negative meniscus lens $L_{22}$ convex on its object side, and a double-convex positive lens $L_{23}$.

Between the first lens group $G_1$ and the second lens group $G_{2\,3}$, there is the aperture stop S interposed.

The third lens group $G_3$ consists of, in order from the object side to the image side, one negative meniscus lens $L_{31}$ convex on its object side.

The fourth lens group $G_4$ consists of, in order from the object side to the image side, one positive meniscus $L_{41}$ convex on its image side.

How the respective lens groups move upon zooming from the wide-angle end to the telephoto end of the zoom lens according to Example 2 is now explained.

Upon zooming operation, the first lens group $G_1$, the second lens group $G_2$, the third lens group $G_3$, and the fourth lens group $G_4$ move independently.

From the wide-angle end to the standard setting, the first lens group $G_1$ moves to the image side while the spacing between it and the second lens group $G_2$ becomes narrow, and from the standard setting to the telephoto end, the first lens group $G_1$ moves to the objet side while the spacing between it and the second lens group $G_2$ becomes narrow. The first lens group $G_1$ is positioned more on the object side at the telephoto end than at the wide-angle end.

From the wide-angle end to the telephoto end, the second lens group $G_2$ moves with the aperture stop S to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

The fourth lens group G4 does not move all the way from the wide-angle end to the telephoto end.

Six aspheric surfaces are used: two at both surfaces $r_3$ and $r_4$ of the negative meniscus lens $L_{12}$ in the first lens group $G_1$, which is convex on its object side, two at both surfaces $r_8$ and $r_9$ of the double-convex positive lens $L_{21}$ in the second lens group $G_2$, and two at both surfaces $r_{16}$ and $r_{17}$ of the positive meniscus lens $L_{41}$ in the fourth lens group $G_4$, which is convex on its image side.

Set out below are numeral data sets of Examples 1 and 2 (surface data, zoom data, and the focal lengths of the respective lens groups).

The surface data include, for each Surface No., the radius r of curvature and surface separation d of the lens surface (optical surface), the d-line (587.6 nm) refractive index nd of the lens (optical medium), and the d-line Abbe constant vd of the lens (optical medium). The radius of curvature r, and the surface separation d is given in mm. Of the surface data, ∞ radius of curvature means infinity.

Referring to aspheric data, data about the aspheric lens surfaces are given in the surface data. Suppose here that x is an optical axis provided that the direction of travel of light is taken as positive, and y is the direction orthogonal to the optical axis. Then the aspheric shape is represented by the following formula:

$$x=(y^2/r)/\{1+\{1-(1+K)\cdot(y/r)^2\}^{1/2}\}+A4y^4+A6y^6+A8y^8+A10y^{10}\ldots$$

In that formula, r is the paraxial radius of curvature, K is the conic coefficient, and A4, A6, A8 and A10 are the $4^{th}$-, $6^{th}$-, $8^{th}$- and $10^{th}$-order aspheric coefficients. It is here noted that the small letter indicates that the following numerical value is a power exponent with 10 as a base; for instance, $e-5 \times 10^{-5}$ The zoom data include focal lengths, F-numbers (Fno), angles of view (2ω), variable surface separations, back focuses (in air), full lengths (in air), and image heights, all but the F-numbers and angles of view given in mm.

The abbreviations WE, ST, and TE are indicative of the wide-angle end, the standard setting, and the telephoto end, respectively.

The focal length data include the focal lengths f1 to f5 of the respective lens groups, given in mm.

Numeral Example 1

Surface Data

| Surface No. | r | d | nd | vd |
|---|---|---|---|---|
| 1 | 45.630 | 1.00 | 1.91082 | 35.25 |
| 2 | 25.376 | 0.10 | | |
| 3 | 26.504 | 3.35 | 1.49700 | 81.54 |
| 4 | −202.144 | 0.15 | | |
| 5 | 20.762 | 2.72 | 1.49700 | 81.54 |
| 6 | 103.805 | D6 | (Variable) | |
| 7 | 67.214 | 0.40 | 1.88300 | 40.76 |
| 8 | 5.625 | 3.0 | | |
| 9 (Aspheric Surface) | −9.891 | 0.45 | 1.74156 | 49.21 |
| 10 (Aspheric Surface) | 31.018 | 0.36 | | |
| 11 | 20.004 | 1.45 | 1.94595 | 17.98 |
| 12 | −48.069 | D12 | (Variable) | |
| 13 (Stop) | ∞ | 0.66 | | |
| 14 (Aspheric Surface) | 7.119 | 2.70 | 1.58313 | 59.46 |
| 15 (Aspheric Surface) | −57.504 | 0.94 | | |
| 16 | 22.237 | 0.84 | 1.90366 | 31.32 |
| 17 | 5.353 | 0.01 | 1.56384 | 60.67 |
| 18 | 5.353 | 2.40 | 1.51633 | 64.14 |
| 19 | −10.877 | D19 | (Variable) | |
| 20 | −31.402 | 0.40 | 1.51633 | 64.14 |
| 21 | 9.037 | D21 | (Variable) | |
| 22 (Aspheric Surface) | 19.309 | 2.50 | 1.49710 | 81.56 |
| 23 (Aspheric Surface) | −12.531 | D23 | (Variable) | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image Plane | ∞ | | | |

Aspheric Data

9th Surface

K = 0.000
A4 = 1.28630e−05
A6 = 1.44610e−05
A8 = −2.67360e−06
A10 = 7.31670e−08

10th Surface

K = 0.000
A4 = −7.60070e−05
A6 = 1.28040e−05
A8 = −2.05200e−06
A10 = 6.33990e−08

14th Surface

K = 0.000
A4 = −2.64730e−04
A6 = 1.32570e−05
A8 = −1.54810e−06
A10 = 4.79870e−08

15th Surface

K = 0.000
A4 = 3.00590e−04
A6 = 1.58720e−05
A8 = −2.07810e−06
A10 = 7.29910e−08

22th Surface

K = 0.000
A4 = 3.59390e−05
A6 = −3.29620e−05
A8 = 1.47210e−06
A10 = −2.91510e−08

23th Surface

K = 0.000
A4 = 2.99000e−04
A6 = −4.04000e−05
A8 = 1.63000e−06
A10 = −2.87000e−08

Zoom Data

| | WE | ST | TE |
|---|---|---|---|
| Focal Length | 4.55 | 21.10 | 104.57 |
| FNO. | 3.10 | 5.15 | 7.05 |
| Angle of View 2ω (°) | 80.57 | 20.05 | 4.14 |
| Image Height | 3.84 | 3.84 | 3.84 |
| D6 | 0.32 | 13.23 | 26.71 |
| D12 | 16.82 | 5.07 | 0.54 |
| D19 | 3.54 | 10.45 | 9.65 |
| D22 | 2.37 | 7.05 | 15.19 |
| D23 | 5.25 | 3.06 | 1.04 |
| fb (in air) | 6.70 | 4.53 | 2.52 |
| Full Lens Length (in air) | 53.21 | 63.81 | 78.07 |

Focal Lengths of the Lens Groups

| | |
|---|---|
| f1 | 40.76 |
| f2 | −5.67 |
| f3 | 10.11 |
| f4 | −13.55 |
| f5 | 15.70 |

Numeral Example 2

Surface Data

| Surface No. | r | d | nd | vd |
|---|---|---|---|---|
| 1 | 77.954 | 1.80 | 1.77250 | 49.60 |
| 2 | 11.588 | 4.36 | | |
| 3 (Aspheric Surface) | 40.602 | 2.00 | 1.52542 | 55.78 |
| 4 (Aspheric Surface) | 20.867 | 2.08 | | |
| 5 | 27.008 | 2.08 | 1.84666 | 23.78 |
| 6 | 80.482 | D6 (Variable) | | |
| 7 (Stop) | ∞ | 1.00 | | |
| 8 (Aspheric Surface) | 15.653 | 4.27 | 1.58313 | 59.46 |
| 9 (Aspheric Surface) | −42.316 | 2.09 | | |
| 10 | 77.079 | 1.62 | 1.80518 | 25.43 |
| 11 | 17.333 | 1.26 | | |
| 12 | 285.410 | 3.22 | 1.49700 | 81.54 |
| 13 | −14.417 | D13 (Variable) | | |
| 14 | 68.546 | 1.20 | 1.62041 | 60.29 |
| 15 | 25.465 | D15 (Variable) | | |
| 16 (Aspheric Surface) | −41.615 | 2.36 | 1.52542 | 55.78 |
| 17 (Aspheric Surface) | −28.114 | D17 (Variable) | | |
| 18 | ∞ | 0.30 | 1.51633 | 64.14 |
| 19 | ∞ | 0.40 | | |
| 20 | ∞ | 0.50 | 1.51633 | 64.14 |
| 21 | ∞ | 0.53 | | |
| Image Plane | ∞ | | | |

Aspheric Data

3rd Surface

K = 0.000
A4 = −5.34419e−05
A6 = 6.50544e−07
A8 = −4.66175e−09

4th Surface

K = 0.000
A4 = −1.13249e−04
A6 = 5.55538e−07
A8 = −6.99697e−09

8th Surface

K = 0.000
A4 = −2.92183e−05
A6 = −8.55319e−08
A8 = −6.12894e−09

9th Surface

K = 0.000
A4 = 7.20769e−05
A6 = −1.74406e−07
A8 = −6.21813e−09

16th Surface

K = 0.000
A4 = 7.99281e−07
A6 = 2.83990e−07
A8 = 3.49115e−10

17th Surface

K = 0.000
A4 = 9.57808e−06
A6 = 2.48070e−07
A8 = 5.47588e−10

Zoom Data

| | WE | ST | TE |
|---|---|---|---|
| Focal Length | 14.30 | 24.07 | 41.17 |
| FNO. | 3.63 | 4.50 | 5.71 |
| Angle of View 2ω (°) | 76.01 | 45.98 | 27.14 |
| Image Height | 10.00 | 10.00 | 10.00 |
| D6 | 27.84 | 12.16 | 2.44 |
| D13 | 1.44 | 2.32 | 4.07 |
| D15 | 10.18 | 20.26 | 36.71 |
| D17 | 16.63 | 16.63 | 16.63 |
| fb (in air) | 18.36 | 18.36 | 18.36 |
| Full Lens Length (in air) | 87.16 | 82.44 | 90.92 |

Focal Lengths of the Lens Groups

| f1 | −23.31 |
|---|---|
| f2 | 21.08 |
| f3 | −66.01 |
| f4 | 155.56 |

Figure 9:
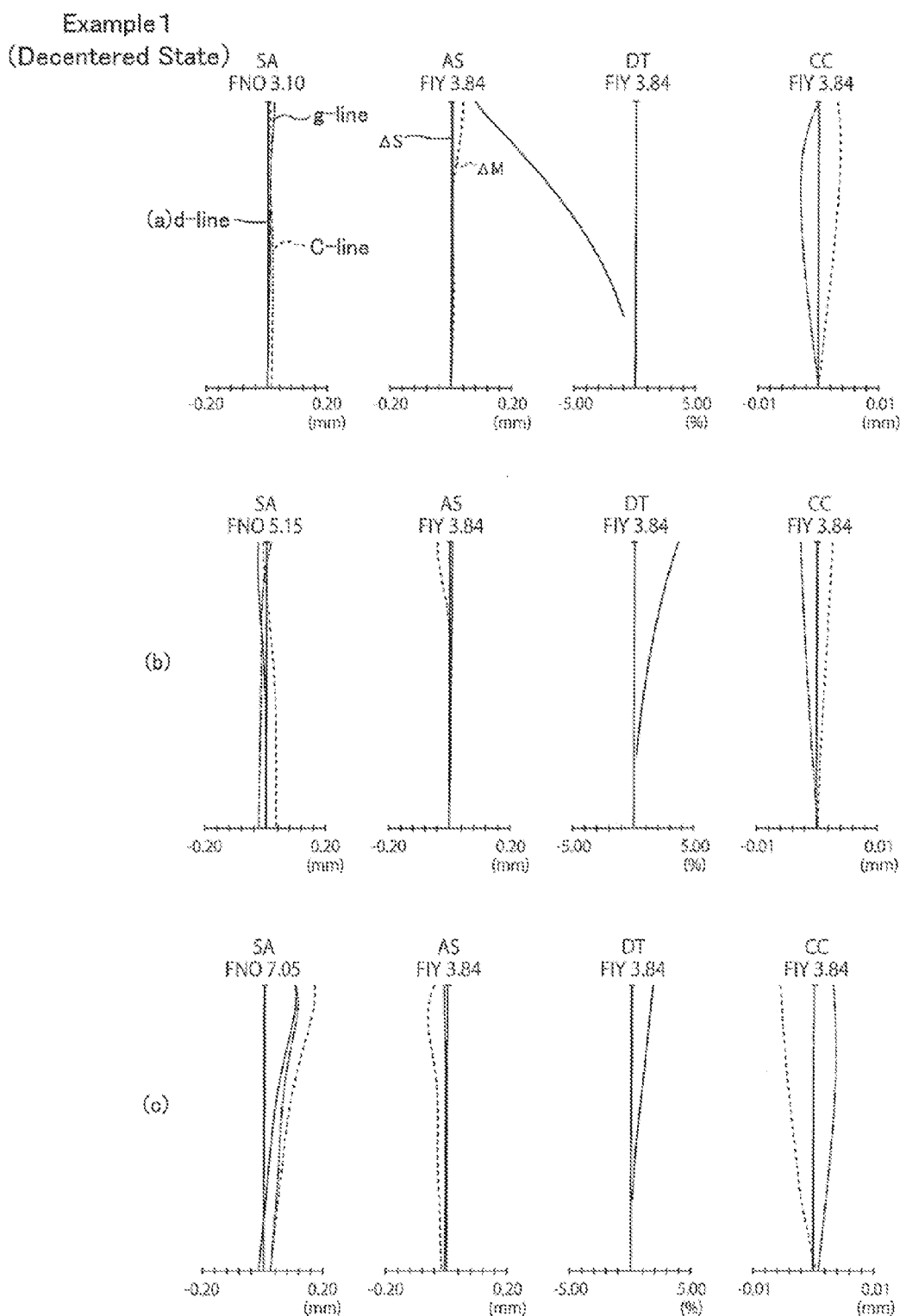
FIG. 9 is a set of aberration diagrams for the zoom lens according to Example 2 in its initial state.

FIG. 7 is a set of aberration diagrams for Example 1 in its initial state (a) at the wide-angle end (WE), (b) in the standard setting (ST), and (c) at the telephoto end (TE). FIG. 8 is a set of aberration diagrams for Example 2 in its initial state (a) at the wide-angle end (WE), (b) in the standard setting (ST), and (c) at the telephoto end (TE). FIG. 9 is a set of aberration diagrams for Example 1 in its decentered state (a) at the wide-angle end (WE), (b) in the standard setting (ST), and (c) at the telephoto end (TE). FIG. 10 is a set of aberration diagrams for Example 2 in its decentered state (a) at the wide-angle end (WE), (b) in the standard setting (ST), and (c) at the telephoto end (TE).

In these aberration diagrams, the abbreviations SA, AS, DT, and CC are indicative of spherical aberrations, astigmatism, distortion, and chromatic aberration of magnification, respectively. There are the spherical aberrations SA given at the wavelengths: 587.6 nm (d-line; a solid line), 486.1 nm (F-line; a one-dot line), and 656.3 nm (C-line; a broken line). There are the chromatic aberrations of magnification CC given at the wavelengths: 486.1 nm (F-line; a one-dot line) and 656.3 nm (C-line; a broken line) on a d-line basis. The astigmatism AS is shown by a solid line for that of the sagittal image surface, and by a broken line for that of the meridional image surface. Note here that FNO and FIY are indicative of an F-number and an image height, respectively.

In Example 1, the first lens group $G_1$ is moved 0.02 mm at the wide-angle end, 0.04 mm in the standard setting, and 0.14 mm at the telephoto end as it is decentered from the initial state vertically to the optical axis. Even when the first lens group $G_1$ is moved vertically to the optical axis into the decentered state, aberrational fluctuations are reduced enough to cover aberrations by the correction action of the imaging device, as shown in FIG. 9. Even in the decentered state, therefore, there can be image quality ensured that is equivalent to that in the initial state imaging, preventing the quality of synthesized 3D images from going worse.

Likewise in Example 2, the first lens group $G_1$ is moved 0.02 mm at the wide-angle end, 0.02 mm in the standard setting, and 0.03 mm at the telephoto end as it is decentered from the initial state vertically to the optical axis. Even when the first lens group $G_1$ is moved vertically to the optical axis into the decentered state, aberrational fluctuations are reduced enough to cover aberrations by the correction action of the imaging device, as shown in FIG. 10. Even in the decentered state, therefore, there can be image quality ensured that is equivalent to that in the initial state imaging, preventing the quality of synthesized 3D images from going worse.

Set out below are the values of Conditions (1) and (2) in Examples 1 and 2.

|  | Ex. 1 (WE) | Ex. 1 (ST) | Ex. 1 (TE) |
| --- | --- | --- | --- |
| Cond. (1) | 0.022 | 0.042 | 0.139 |
| Cond. (2) | 0.05 | 0.05 | 0.05 |
|  | Ex. 2 (WE) | Ex. 2 (ST) | Ex. 2 (TE) |
| Cond. (1) | 0.019 | 0.022 | 0.036 |
| Cond. (2) | 0.05 | 0.05 | 0.05 |

To cut off undesired light such as ghosts and flares, a flare stop other than the aperture stop may be located in the zoom lens according to the invention. This flare stop may be located in any desired site, for instance, on the object side of the first lens group, between the first and the second lens group, between the second and the third lens group, between the third and the fourth lens group, between the fourth and the fifth lens group, or between the fifth lens group and the image plane.

Flare rays may also be cut off by a frame member or other member. The flare stop may be printed directly, coated, sealed or otherwise bonded to the optical system. The flare stop may be configured in any desired shape such as circular, oval, rectangular or polygonal shape, or may otherwise be defined by a range surrounded by a function curve. In addition to harmful light beams, light beams such as coma flares around the screen may also be cut.

Each lens may be provided with an anti-reflection coating to reduce ghosts and flares. In particular, an antireflection multicoating is preferable because of the ability to effectively reduce ghosts and flares. An infrared cut coating may optionally be applied to each lens surface, cover glass, etc. Optionally, brightness shading around images may be reduced by shifting the micro-lenses of a CCD. For instance, microlens design for the CCD may be altered in association with the angle of incidence of rays at the respective image heights, and image processing may be applied to correct a decrease in light around images.

In general, an antireflection coating is applied to an air contact surface of a lens to prevent occurrence of ghosts and flares. At the cementing surface of a cemented lens, on the other hand, the refractive index of an adhesive is ever higher than that of air. For this reason, the cementing surface has often a reflectivity on a par with, or lower than, that of a single-layer coating; so it is less likely to be coated. If the antireflection coating is purposefully applied to the cementing surface too, however, it is then possible to achieve further ghost and flare reductions, thereby making sure good images. Especially in recent years, high-refractive-index vitreous materials have gained popularity, and have often been used on camera optical systems because of having good action on correction of aberrations. However, when such vitreous materials are used for cemented lenses, there is difficult-to-neglect reflection occurring from the cementing surface. In that case, it is particularly effective to apply the antireflection coating to the cementing surface.

How to make effective use of cementing surface coating is set forth typically in JP(A) s 2-27301, 2001-324676 and 2005-92115 as well as U.S. Pat. No. 7,116,482. According to the teachings of these publications referring to the surface coating of a cemented lens in the first lens group of positive power in a zoom lens in particular, the cemented lens surface in the first lens group of the invention may be coated too.

The coating material used may optionally be selected from materials having relatively high refractive indices such as $Ta_2O_5$, $TiO_2$, $Nb_2O_5$, $ZrO_2$, $HfO_2$, $CeO_2$, $SnO_2$, $In_2O_3$, $ZnO$ and $Y_2O_3$, and materials having relatively low refractive indices such as $MgF_2$, $SiO_2$ and $Al_2O_3$ depending on the refractive index of the lens to be used and the refractive index of the associated adhesive, and the coating thickness may be set in such a way as to meet phase conditions.

It is a matter of course that multicoating may be applied to the cementing surface as is the case with the coating of the air contact surface of a lens. If double coatings or multicoatings may be combined with film thicknesses, it is then possible to achieve further reflectivity reductions and gain control of the spectral and angular characteristics of reflectivity, etc. It goes without saying that coating on the same idea may also be effectively applied to any cementing surface in other lens group.

Figure 11:
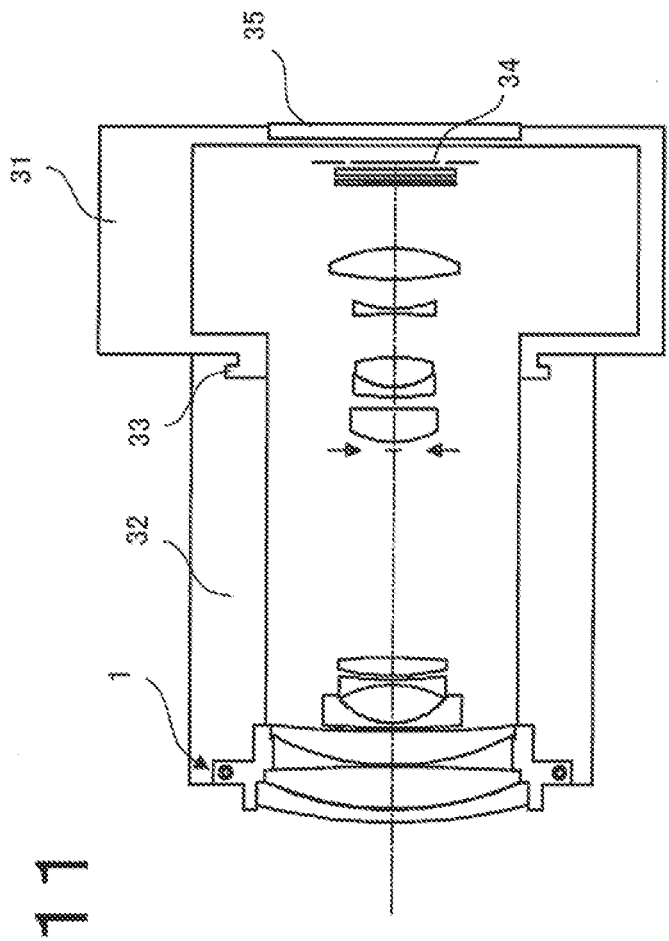
FIG. 11 is a sectional view of an imaging apparatus wherein the zoom lens according to one embodiment of the invention is used as an interchangeable lens.

FIG. 11 is a sectional view of a single-lens mirrorless camera that is one example of the imaging apparatus that uses the zoom lens according to a specific embodiment of the invention and incorporates a small-format CCD, CMOS or the like as an imaging device. In FIG. 11, reference numeral 31 is a single-lens mirrorless camera; 32 is an imaging lens system located within a lens barrel; and 33 is a lens barrel mount for making the imaging lens system 32 attachable to or detachable from the single-lens mirrorless camera 31. For that lens mount, for instance, a screw or bayonet type mount may be used. The bayonet type mount is here used. Reference numerals 34 and 35 are an imaging device plane and a back monitor, respectively.

As the imaging lens system 32 in the thus assembled single-lens mirrorless camera 31, for instance, the zoom lenses of Examples 1 and 2 that embody the present invention may be used.

Figure 12:
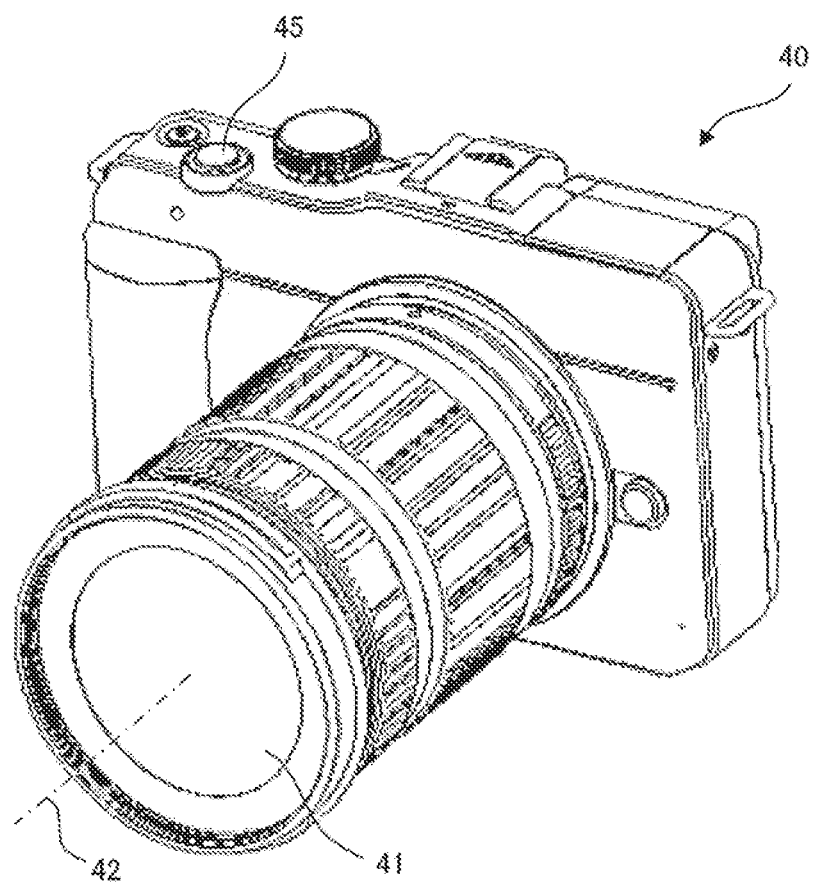
FIG. 12 is a front perspective view of the outside configuration of a digital camera according to one embodiment of the invention.
Figure 13:
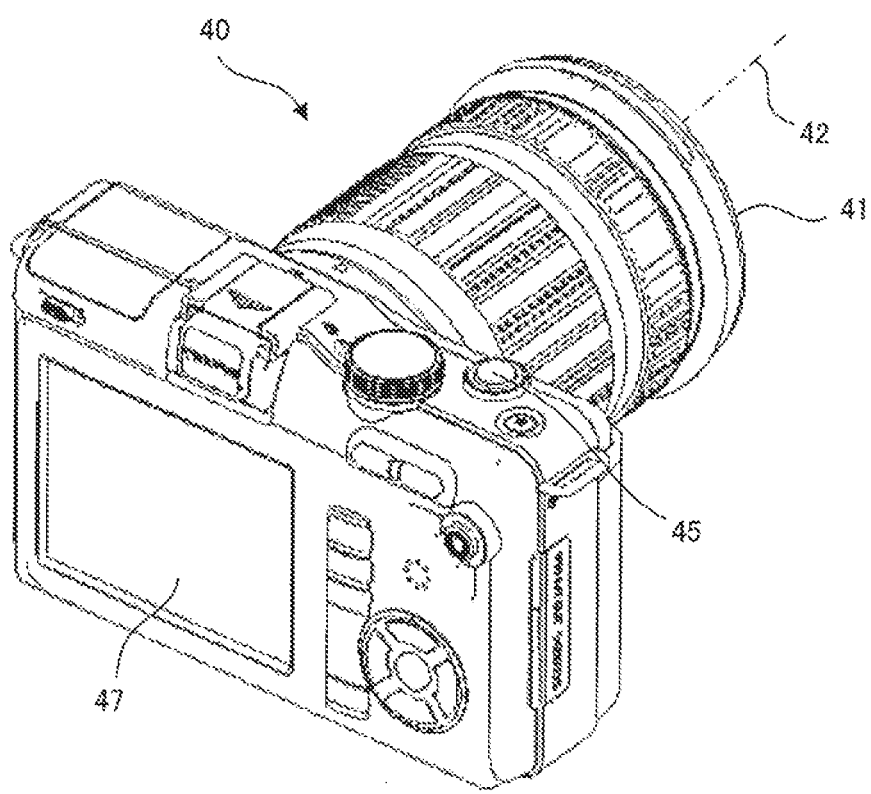
FIG. 13 is a rear perspective view of the outside shape of a digital camera according to one embodiment of the invention.

FIGS. 12 and 13 are illustrative in conception of the inventive imaging apparatus in which the zoom lens is built in an image-taking optical system 41. More specifically, FIG. 12 is a front perspective view of the outside configuration of a digital camera 40 as the imaging apparatus, and FIG. 13 is a rear view of the same.

In this embodiment, the digital camera 40 includes an image-taking optical system 41 positioned on a taking optical path 42, a shutter button 45, a liquid crystal display monitor 47, and so on. As the shutter button 45 located on the upper portion of the camera 40 is pressed down, it causes images to be taken through the image-taking optical system 41, for instance, the lens system of Example 1. An object image formed through the image-taking optical system 41 is formed on the imaging device (photoelectric transformation plane) located in the vicinity of the imaging plane. The object image received on the imaging device is displayed as an electronic image on the liquid crystal display monitor 47 located on the back of the camera via processing means. The taken electronic images may be recorded in recording means.

Figure 14:
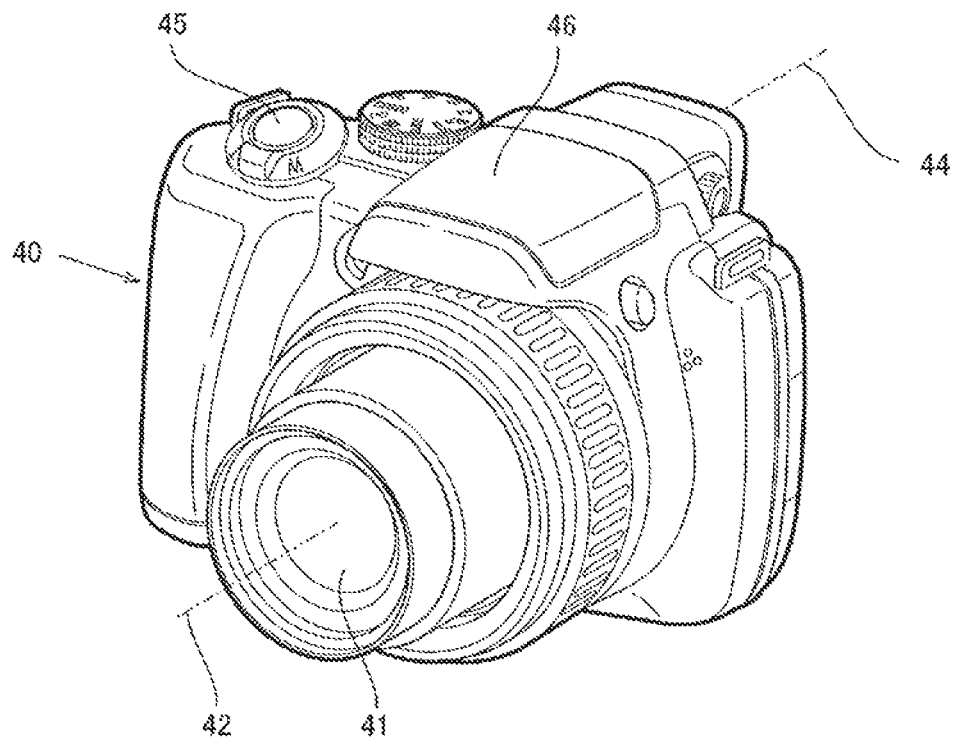
FIG. 14 is a front perspective view of the outside configuration of a digital camera according to another embodiment of the invention.
Figure 15:
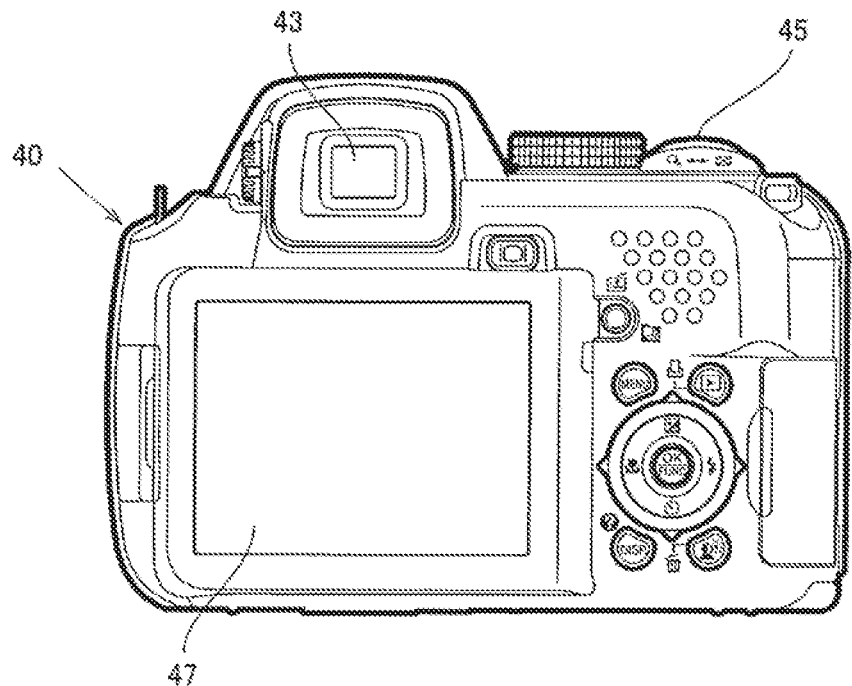
FIG. 15 is a rear perspective view of the outside configuration of a digital camera according to another embodiment of the invention.
Figure 16:
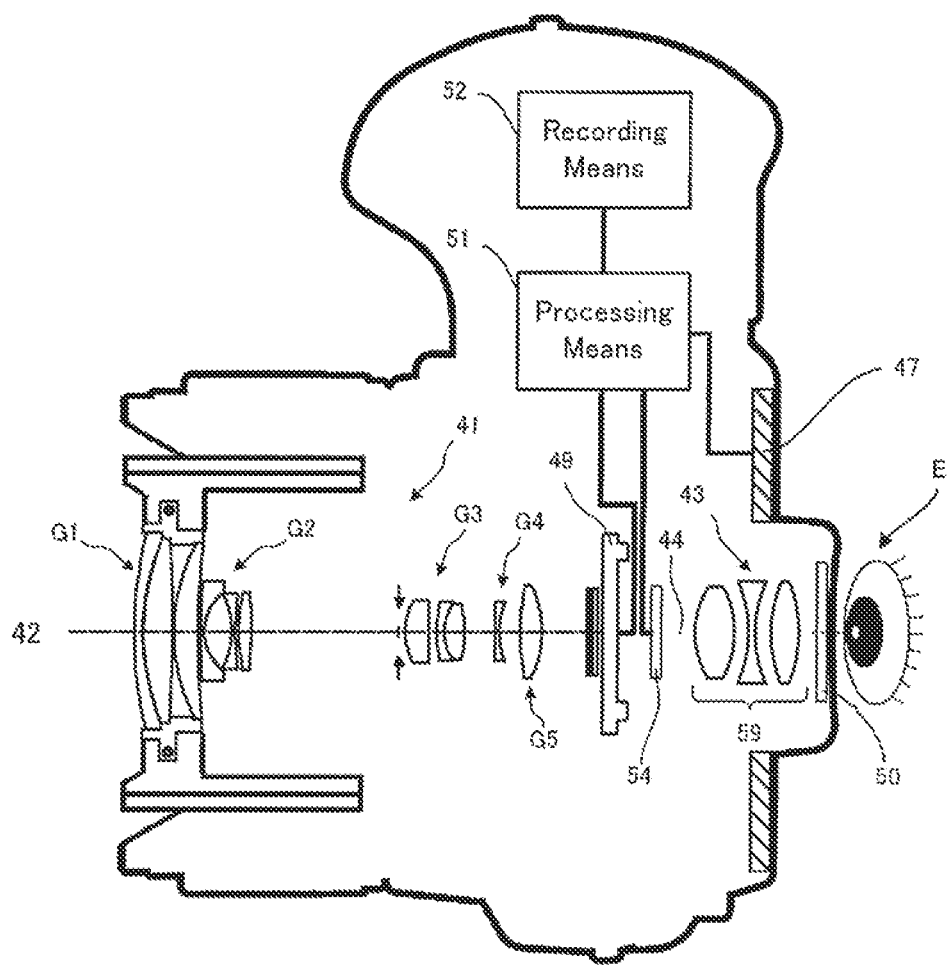
FIG. 16 is a cross-sectional, schematic view of the construction of a digital camera according to another embodiment of the invention.

FIGS. 14, 15 and 16 are illustrative in conception of the arrangement of other imaging apparatus having a zoom lens incorporated in the imaging optical system 41. More specifically, FIG. 14 is a front perspective view illustrating the outside configuration of the digital camera 40; FIG. 15 is a rear view of the same; and FIG. 16 is a schematic, cross-sectional view of the arrangement of the digital camera 40.

The digital camera 40 here an image-taking optical system 41 positioned on a taking optical path 42, a finder optical system 43 positioned on a finder optical path 44, a shutter button 45, a popup strobe 46, a liquid crystal display monitor 47, and so on. As the shutter button 45 located on the upper portion of the camera 40 is pressed down, it causes images to be taken through the image-taking optical system 41, for instance, the lens of Example 1. An object image formed through the image-taking optical system 41 is formed on the imaging device CCD 49 (photoelectric transformation plane) located in the vicinity of the imaging plane. The object image received on the CCD 49 is displayed as an electronic image on the liquid crystal display monitor 47 located on the back of the camera or a finder image display device 54 via processing means 51. The taken electronic images may be connected with recording means 52 for recording taken electronic images in it.

It is here to be noted that the recording means 52 may be provided separately from the processing means 51, and may also be designed such that images are electronically recorded and written in a flexible disk, a memory card, an MO or the like. If silver halide film is loaded in place of the CCD 49, there may then be a silver halide camera set up.

In addition, there is a finder eyepiece lens 59 located on the finder optical path 44. An object image displayed on the finder image display device 54 is enlarged or adjusted to an easy-to-view diopter by this finder eyepiece lens 59, and then guided to the viewer s eyeball E. Note here that a cover member 50 is located on the exit side of the finder eyepiece lens 59.

Figure 17:
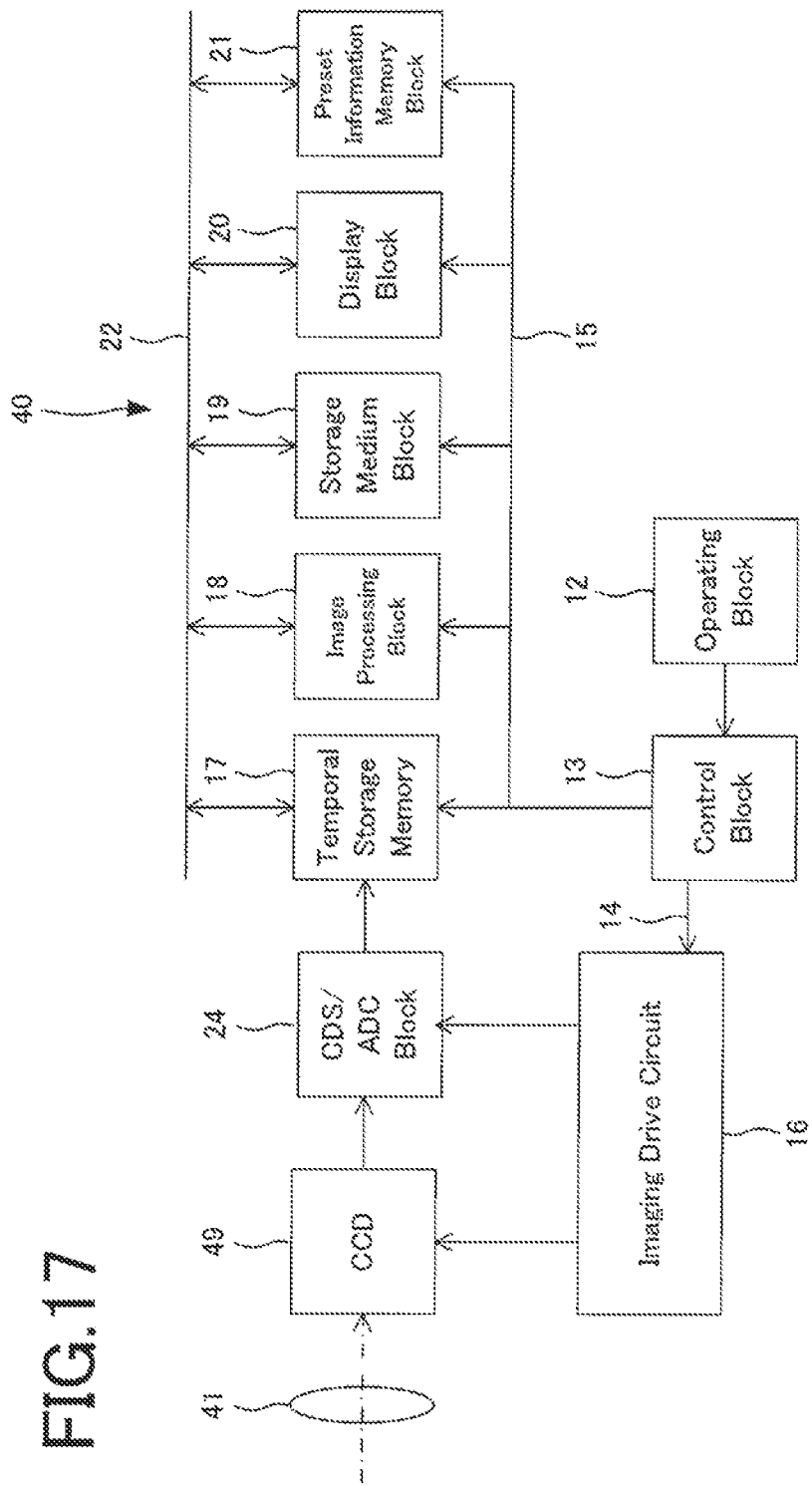
FIG. 17 is a block diagram of the control arrangement for a digital camera according to one embodiment of the invention.

FIG. 17 is a block diagram for the internal circuitry in the main part of the digital camera 40. In what follows, the aforesaid processing means 51 is made up of, typically, a CDS/ADC block 24, a temporary storage memory 17 and an image processing block 18, and a storage means 52 is made up of, typically, a storage medium block.

The digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown), and has control over the digital camera 40 according to the program loaded in the program memory.

The CCD 49 is an imaging device that is driven and controlled by the imaging drive circuit 16, and converts or transforms light quantity per pixel of the object image formed through the imaging optical system 41 into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing including distortion correction, based on an image quality parameter instructed by the control block 13.

The storage medium block 19 detachably receives a card type or stick type recording medium comprising typically a flash memory so that the RAW data transferred from the temporal memory 17 or image data processed at the image processing block 18 are recorded and held in that flash memory.

The display block 20 includes the liquid crystal display monitor 47 and so on to display the taken RAW data or image data, operating menus or the like on it. The preset information storage memory block 21 includes a ROM sub-block having various image quality parameters previously loaded in it, and a RAM sub-block for storing an image quality parameter read out of that ROM sub-block by entering operation of the operating block 12.

The thus assembled digital camera 40, because the inventive zoom lens is used as the imaging optical system 41, may be used as a small-format imaging apparatus suitable well fit for the taking of moving images.

While various embodiments of the invention have been explained, it is to be understood that the present invention is never limited thereto, and embodiments comprising combinations of the essential requirements and limitations are embraced in the category of the invention too.

What is claimed is:

1. A zoom lens unit, comprising:
    a zoom lens including a plurality of lens groups operable to move in an optical axis direction upon zooming from a wide angle end to a telephoto end,
    a first lens group frame for supporting a first lens group positioned on the most object side of said zoom lens, and
    a drive operable to move said first lens group frame in a vertical direction to said optical axis.

2. The zoom lens unit according to claim 1, which satisfies the following condition (1):

$$0.0005 < |\alpha/D| < 0.2 \quad (1)$$

where α is a maximum distance between a point of connection of said optical axis with an image plane in an initial state of said first lens group before movement and a point of connection of said optical axis with said image plane in a decentered state of said first lens group after movement, and
    D is a maximum image height at said image plane.

3. The zoom lens unit according to claim 1, which satisfies the following condition (2):

$$0 < |AS| \leq 0.05 \quad (2)$$

where AS is a quantity of change of field curvature of a meridional surface at a diagonal position.

4. The zoom lens unit according to claim 1, wherein, given that a position of the first lens group in an initial state before movement is a first position, and a position of the first lens group in a decentered state after movement, where the first lens group is away from said initial state by a given distance in a direction vertical to said optical axis, is a second position, said first lens group frame moves to a third position symmetric with respect to the second position with said optical axis as center.

5. An imaging apparatus, comprising:
    the zoom lens unit according to claim 1,
    an imaging device that is located on an image side of said zoom lens unit and includes an imaging plane for receiving an image formed through said zoom lens unit, and
    an imaging apparatus body including said imaging device disposed inside.

* * * * *